United States Patent Office 3,190,939
Patented June 22, 1965

3,190,939
PARAFFIN ISOMERIZATION PROCESS USING HYDROGEN MORDENITE CATALYST
Hans A. Benesi, Berkeley, Calif., assignor to Shell Oil Company, New York, N.Y., a corporation of Delaware
No Drawing. Filed Aug. 19, 1963, Ser. No. 303,126
9 Claims. (Cl. 260—683.65)

This invention relates to a process for the catalytic conversion of hydrocarbons and relates more particularly to a process for the isomerization of low molecular weight normal paraffins.

The isomerization of low molecular weight normal paraffins, i.e. normal paraffins having from 4 through 6 carbon atoms per molecule are well known. In general, the isomerization can be effected at low temperatures with a Friedel-Crafts catalyst, such as aluminum chloride, or at high temperatures with a supported metal catalyst, such as platinum on halogenated alumina or silica-alumina. Thermodynamic equilibrium for isoparaffins is more favorable at low temperatures; however, the low temperature process has not received wide application because the Friedel-Crafts catalyst is quite corrosive and therefore expensive metals or alloys must be used. Of the high temperature isomerization processes, the noble metal catalysts such as platinum or palladium are perhaps considered to be the most effective. These noble metals are quite expensive and add materially to the cost of a high temperature isomerization process.

It has now been found that low molecular weight normal paraffins can be isomerized to isoparaffins at an elevated temperature by means of a particular crystalline alumino-silicate of the zeolite type. In accordance with the process of the invention, a normal paraffin having from 4 through 6 carbon atoms per molecule is contacted with a catalyst comprising a hydrogen form of a crystalline alumino-silicate known as hydrogen mordenite in the presence of hydrogen at a temperature in the range from about 550° to 625° F. In a preferred embodiment, the contacting is effected at a pressure from about atmospheric to about 1000 p.s.i.g., a space velocity in the range from about 0.5 to 10, and a hydrogen to oil molar ratio in the range from about 1:1 to 25:1.

Zeolites are porous crystalline alumino-silicates and are well known in the art. Naturally occurring zeolites are, for example, chabazite, gmelinite, erionite, and faujasite. Zeolites have rigid three-dimensional anionic networks with intracrystalline channels whose narrowest cross section has essentially a uniform diameter. Zeolites are to be distinguished over crystalline alumino-silicate clays such as bentonite, which have a two-dimensional layer structure, and over amorphous alumino-silicates such as synthetic silica-alumina cracking catalyst, which has a random structure. Synthetic zeolites, designated as Type X and Type A molecular sieves, are commercially available from Linde Company.

The zeolites are composed of alkali or alkaline earth metal oxides, alumina and silica in various proportions. In the case of a given zeolite, the intracrystalline channels, generally designated as pores, can be varied in size to a certain extent by replacing all or part of the exchangeable cations with other suitable ions by ion-exchange. The zeolites are used for drying and for separating certain hydrocarbon types, and even have been proposed as catalyst for such hydrocarbon conversion reactions as cracking. In general, however, cracking activity of the zeolites is less than that of the conventional amorphous silica-alumina cracking catalyst.

The catalyst employed in the process of this invention is a particular form of zeolite known as mordenite. While mordenite is naturally occurring, a synthetic mordenite known as Zeolon has become available commercially from the Norton Company. Mordenite is characterized by its high silicon to aluminum ratio of about 5:1 and its crystal structure. Compositions of mordenite as given in Kirk-Othmer, "Encyclopedia of Chemical Technology," vol. 12, page 297, is $(Ca, Na_2)Al_2Si_9O_{22}6H_2O$. The proposed structure is one in which the basic building block is a tetrahedron consisting of one silicon or aluminum atom surrounded by four oxygen atoms. The crystal is made up of chains of four-and-five-membered rings of these tetrahedra. These four- and five-membered rings are believed to give the structure its stability. The chains are linked together to form a network having a system of large parallel channels interconnected by small cross channels. Rings of 12 tetrahedra form the large channels. Other synthetic zeolites also have such 12-membered rings but they have interconnected cages whereas the mordenite has parallel channels of uniform diameter. For example, synthetic faujasite, which has the formula $Na_3Al_3Si_4O_{14}$, is characterized by a three-dimensional array of pores which consist of 12–13° A. cages interconnected through 8–9° A. windows.

For use as a catalyst in the process of the invention, the sodium form of mordenite is converted to the hydrogen form, which is often referred to as the acid form. Conversion of the sodium form to the hydrogen form is achieved either by the direct replacement of sodium ions with hydrogen ions or by replacement of sodium ions with ammonium ions followed by decomposition of the ammonium form by calcination. At least about 95%, and preferably at least about 99%, of the alkali metal is removed by the ion-exchange. Chemical analysis of the calcined product of the ammonium form of mordenite shows that complete decomposition of the ammonium ion has occurred, yet the X-ray pattern of the product is the same as that of the original ammonium form. Thus, no attack on the crystalline alumino-silicate lattice is detected.

On the other hand, calcination of the ammonium form of other zeolites such as erionite and faujasite destroys the crystalline alumino-silicate lattice. For example, a naturally occurring zeolite known as erionite which has the approximate formula $M_2Al_2Si_7O_{18}$, where M represents exchangeable alkaline and alkaline earth metal ions, can be converted to the ammonium form by extensive washing with ammonium nitrate solution. X-ray diffraction films of the product before and after calcination in air at 500° C. indicate that most of the crystalline alumino-silicate lattice is destroyed during calcination to form amorphous material. Similarly, a synthetic faujasite denoted as 13X by the manufacturer, Linde Company, and having the formula $Na_3Al_3Si_4O_{14}$, can be converted to the ammonium form. X-ray examination of the decomposition product of the ammonium form of this faujasite shows that extensive destruction of the lattice occurs in this case, also. Again, amorphous material is formed.

The hydrogen form of mordenite is an excellent catalyst for the isomerization of low molecular weight normal paraffins, such as normal pentane. Other acidic solids such as silica-alumina cracking catalyst or platinum on halogenated alumina reforming catalyst has little or no activity for the isomerization of low molecular weight normal paraffin under similar conditions.

Feed to the process of the invention can be a substantially pure normal paraffin having from 4 through 6 carbon atoms, mixtures of such normal paraffins, or hydrocarbon fractions rich in such normal paraffins. Suitable hydrocarbon fractions are the $C_4$ to $C_6$ straight-run fractions or $C_5$–$C_6$ straight-run fractions.

The process of the invention is conducted at a temperature in the range from about 550° to 625° F. and preferably from about 575° to 625° F. At lower temperatures, conversion of normal paraffin is generally too low to be practical, although selectivity to isoparaffins is substantially 100%. At higher temperatures, conversion of normal paraffins is quite high, however, excessive cracking is encountered and selectivity to isoparaffin is extremely low as a result.

The isomerization reaction can be conducted over a wide range of space velocities, but in general the space velocity is in the range from about 0.5 to 10 and preferably from about 1 to 5. In general, conversion of normal paraffins decreases with an increase in space velocity, although selectivity to the isoparaffin is increased. Space velocity, as the term is used herein, refers to WHSV and is expressed as weight of feed per hour per unit weight of catalyst.

The isomerization reaction is carried out in the presence of hydrogen; however, there is little or no net consumption of hydrogen in the process. Any consumption of hydrogen is the result of hydrocracking reactions and it is preferred to keep such reactions to a minimum. The function of the hydrogen is primarily to improve catalyst life, apparently by preventing polymerization of intermediate reaction products which would otherwise polymerize and deposit on the catalyst. A hydrogen to oil mole ratio of from about 1:1 to 25:1 and preferably from about 5:1 to 15:1 is used. It is not necessary to employ pure hydrogen since hydrogen-containing gases, e.g. hydrogen-rich gas from the catalytic reforming of naphthas, are suitable. Total pressure is in the range from about atmospheric to 1000 pounds per square inch gauge (p.s.i.g.) and preferably from about 300 to 750 p.s.i.g.

Hydrogen mordenite is an active catalyst and does not require the presence of a catalytic metal to bring about the isomerization of normal paraffins. However, it is often advantageous to incorporate into mordenite catalytic metals or other promoters which enhance catalytic activity and/or stability. This can be done, for example, by contacting the ammonium form of mordenite with a solution of a salt of the particular metal desired. Where the metal is in the form of a cation, the metal will be incorporated into the mordenite by ion exchange. All or a part of the ammonium ions can be replaced by the metal cations. Where the metal is in the form of an anion, the metal is impregnated onto the catalyst. After the metal has been incorporated into the ammonium form of mordenite, the catalyst is dried and calcined. Metals can be incorporated directly into the hydrogen form of mordenite by impregnation with a metal salt solution.

Metals which can be added to mordenite by ion-exchange or impregnation methods include transitional metals. Metals of Group I-B, such as copper and including silver, Group VI-B (chromium, molybdenum and tungsten) and Group VIII are preferred. In addition to hydrogen, a wide range of cations such as, for example, the metals Cr, Mn, Fe, Co, Ni, Cu, Ag, Zn and Cd, can be exchanged in the mordenite structure. When catalytic metals are incorporated into the mordenite isomerization catalyst, from about 0.01% to 20% and preferably 0.1% to 10% by weight is used.

EXAMPLE I

The hydrogen form of mordenite was prepared by converting Na-Zeolon, a sodium form of synthetic mordenite manufactured by Norton Company, into the ammonium form by ion-exchange with ammonium nitrate followed by calcination at 1022° F. (550° C.) for 16 hours. The hydrogen mordenite contained only 0.01% by weight sodium.

The hydrogen mordenite was compared with amorphous silica-alumina (American Cyanamid MSA-3 cracking catalyst containing about 25% w. alumina, 75% w. silica) for the isomerization of normal pentane at 572° F. (300° C.), atmospheric pressure, 22 WHSV, and 3:1 hydrogen to oil molar ratio. Results are given below. Data are included for a platinum/silica-alumina catalyst prepared from a portion of the MSA-3 cracking catalyst and tetrammine platinous chloride in an amount to provide 0.5% w. Pt in the catalyst.

Table I

| Catalyst: | Conversion, percent w. |
|---|---|
| Silica-alumina | 0.00 |
| 0.5% w. Pt/silica-alumina | 0.14 |
| Hydrogen mordenite | 2.3 |

While the conversions are extremely low at these conditions, differences in activity of the catalysts are readily apparent.

EXAMPLE II

To demonstrate the effect of space velocity on conversion and selectivity, hydrogen mordenite prepared as described in Example I was used to isomerize normal pentane. Isomerization was carried out at 572° F., 600 p.s.i.g., 12:1 hydrogen to oil molar ratio, and at different space velocities. Results are given in Table II.

Table II

| WHSV | Conversion, percent w. | Selectivity to isopentane, percent |
|---|---|---|
| 9.3 | 21.2 | 97 |
| 5.7 | 37.0 | 96 |
| 2.8 | 48.4 | 96 |
| 1.4 | 61.6 | 93 |

EXAMPLE III

In this example, pentane was isomerized over hydrogen mordenite at 572° F., 5.7 WHSV, 12:1 hydrogen to oil molar ratio, and different pressures. Results given in Table III show a substantially elevated pressure is advantageous.

Table III

| Pressure, p.s.i.g. | Conversion, percent w. | Selectivity to isopentane, percent |
|---|---|---|
| 20 | 4.8 | 34 |
| 300 | 49.4 | 88 |
| 600 | 41.4 | 97 |

EXAMPLE IV

Normal pentane was isomerized over hydrogen mordenite, prepared as described in Example I, at 600 p.s.i.g., 5.7 WHSV, 12:1 molar ratio of hydrogen to oil, and at various temperatures. The results are given in Table IV below.

Table IV

| Temp., °F. | Composition of product, percent w. | | | | | | | Selectivity to isopentane |
|---|---|---|---|---|---|---|---|---|
| | n-Pentane | Isopentane | Ethane | Propane | Isobutane | n-Butane | Hexanes | |
| 572 | 73.4 | 25.5 | 0.2 | 0.2 | 0.2 | 0.3 | 0 | 96 |
| 617 | 40.8 | 52.6 | 0.8 | 1.5 | 1.7 | 1.5 | 1.2 | 89 |
| 662 | 4.6 | 11.0 | 2.3 | 38.8 | 24.6 | 17.8 | 0.9 | 12 |
| 705 | 4.4 | 7.5 | 3.5 | 50.2 | 17.0 | 16.5 | 0.9 | 8 |

Table V

| Catalyst | 0.5% Pt/MS-A-3 | | | 0.5% Pt/H-mordenite | | | |
|---|---|---|---|---|---|---|---|
| Time, min | 50 | 145 | 510 | 50 | 430 | 670 | 940 |
| Temp, °F | 572 | 752 | 752 | 572 | 572 | 572 | 572 |
| Pressure, p.s.i.g | 315 | 315 | 613 | 20 | 300 | 600 | 20 |
| Conversion, percent w | 0.07 | 13.4 | 12.1 | 40.5 | 36.6 | 31.3 | 40.0 |
| Selectivity [1] | 100 | 99 | 99 | 80 | 98 | 98 | 77 |
| Product, percent w.: | | | | | | | |
| $C_2$ through $C_4$ | 0 | 0.13 | 0.16 | 6.1 | 0.64 | 0.54 | 6.7 |
| iso-$C_5$ | 0.07 | 13.3 | 12.0 | 32.2 | 35.8 | 30.6 | 30.7 |
| n-$C_5$ | 99.93 | 86.6 | 87.9 | 59.5 | 63.4 | 68.7 | 60.0 |
| $C_6$ | 0 | 0 | 0 | 2.3 | 0.16 | 0.09 | 2.6 |

[1] Percent iso-pentane/percent conversion of n-pentane×100.

The extensive hydrocracking which results at high temperatures is readily apparent.

When normal heptane was passed over hydrogen mordenite at 572° F. under similar conditions, i.e. 600 p.s.i.g., approximately 5 WHSV, and above 10:1 hydrogen to oil molar ratio, only 6% w. of the normal heptane was converted with 0.5% w. isoheptane and 5.5% w. $C_2$–$C_6$ hydrocarbons being obtained in the product. Moreover, conversion dropped rapidly with time. Thus, under these conditions, hydrogen mordenite is unsatisfactory for isomerizing relatively high molecular weight normal paraffins.

EXAMPLE V

In this example, platinum on hydrogen mordenite and on amorphous silica-alumina are compared for the isomerization of normal pentane at 5.7 WHSV and 13:1 hydrogen to oil molar ratio. In each case, the platinum content of the catalyst was 0.5% by weight.

I claim as my invention:

1. A process for isomerizing a normal paraffin having from 4 through 6 carbon atoms per molecule which comprises contacting said normal paraffin at a temperature in the range from about 550° to 625° F. with hydrogen mordenite in the presence of hydrogen.

2. The process according to claim 1 wherein the normal paraffin is normal pentane.

3. A process for isomerizing a normal paraffin having from 4 through 6 carbon atoms per molecule which comprises contacting said normal paraffin with hydrogen mordenite at a temperature in the range from about 550° to 625° F., a pressure in the range from about atmospheric to about 1000 pounds per square inch gauge, a weight hourly space velocity of from about 0.5 to 10, and a hydrogen to oil molar ratio in the range from about 1:1 to 25:1.

4. A process for isomerizing normal pentane which comprises contacting normal pentane with hydrogen mordenite at a temperature in the range from about 575° to 625° F., a pressure in the range from about 300 to 750 pounds per square inch gauge, a weight hourly space velocity of from about 0.5 to 10, and a hydrogen to oil molar ratio in the range from about 1:1 to 25:1.

5. A process for isomerizing normal paraffins having from 4 through 6 carbon atoms per molecule which comprises contacting said normal paraffin in the presence of hydrogen at a temperature in the range from about 550° to 625° F. with hydrogen mordenite having incorporated therewith from about 0.01% to 20% by weight of a metal selected from Group I-B, Group VI-B, Group VIII, and mixtures thereof.

6. The process according to claim 5 wherein the metal is platinum.

7. The process according to claim 5 wherein the isomerization is carried out at a pressure in the range from about atmospheric to 1000 p.s.i.g., a weight hourly space velocity of from about 0.5 to 10, and a hydrogen to oil molar ratio in the range from about 1:1 to 25:1.

8. The process according to claim 7 wherein the normal paraffin is normal pentane.

9. The process according to claim 8 wherein the metal is platinum.

References Cited by the Examiner

UNITED STATES PATENTS

| | | | |
|---|---|---|---|
| 2,971,903 | 2/61 | Kimberlin et al. | 208—119 |
| 2,971,904 | 2/61 | Gladrow et al. | 208—135 |
| 3,033,778 | 5/62 | Frilette | 208—120 |
| 3,039,953 | 6/62 | Eng | 208—46 |
| 3,140,253 | 7/64 | Plank et al. | 208—120 |

ALPHONSO D. SULLIVAN, *Primary Examiner.*